Dec. 2, 1924.  
S. M. FAIRCHILD  
1,517,550  
UNIVERSAL MOUNTING FOR AERIAL CAMERAS  
Filed Oct. 17, 1922  
2 Sheets-Sheet 1
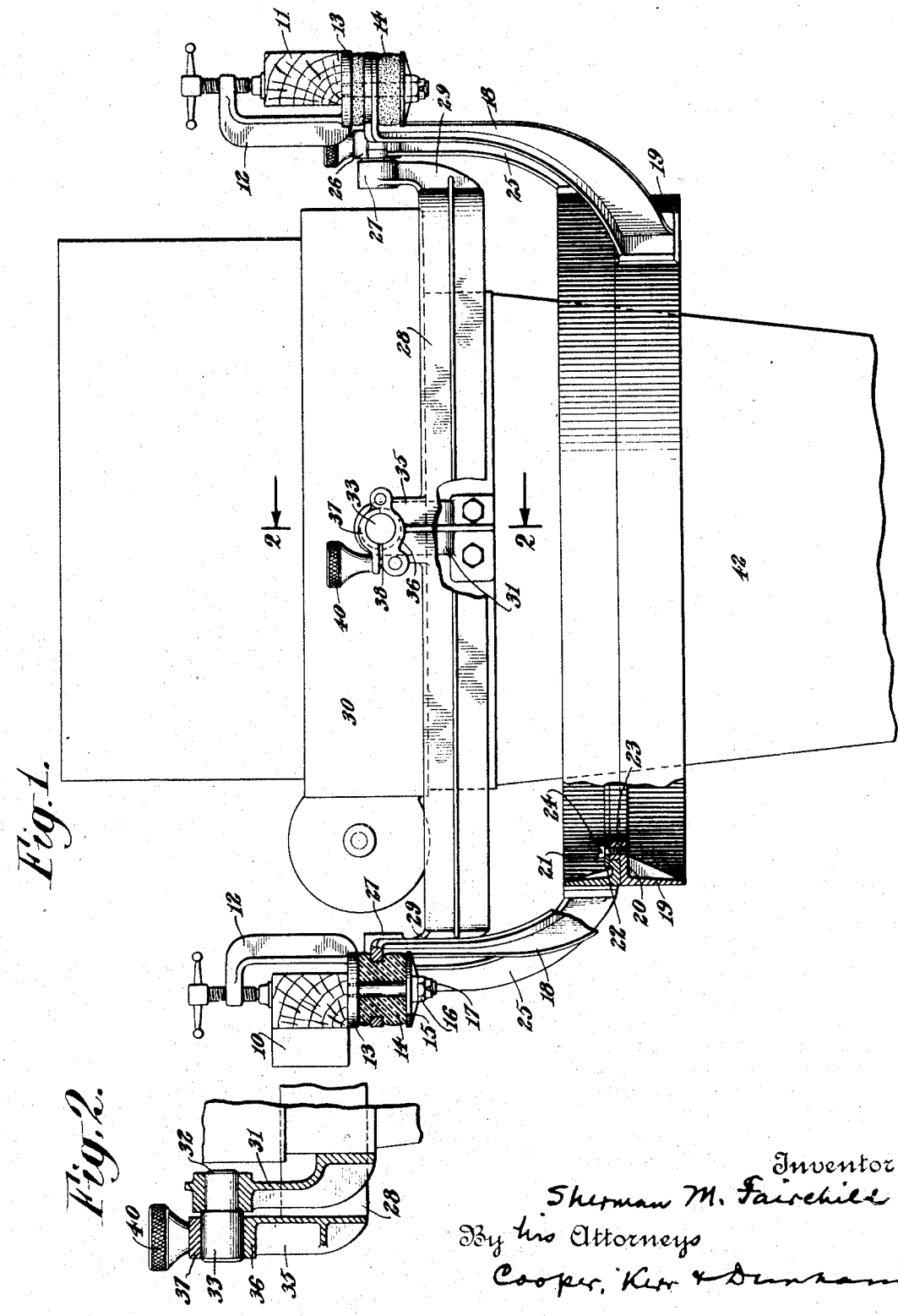

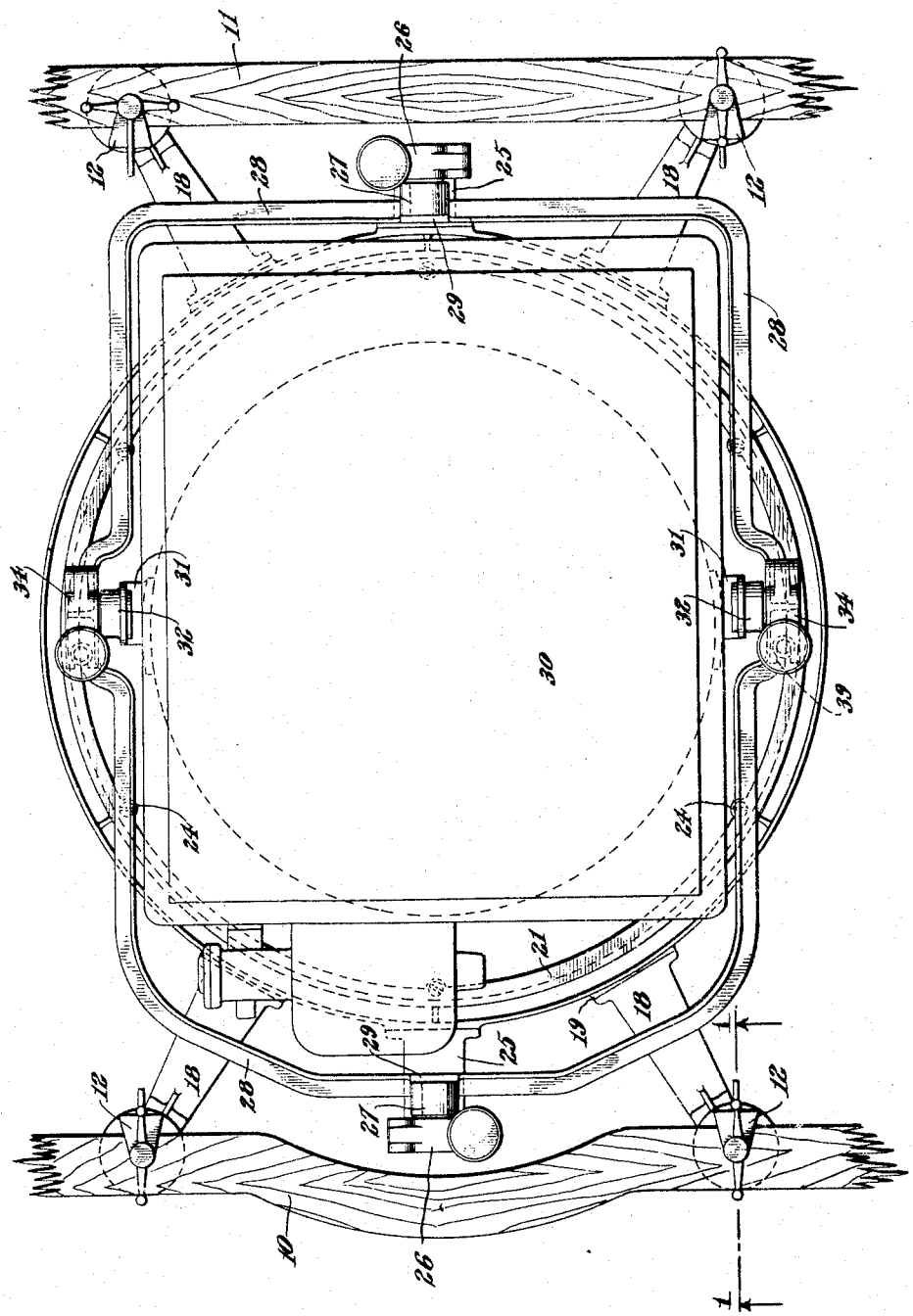

Patented Dec. 2, 1924.

1,517,550

UNITED STATES PATENT OFFICE.

SHERMAN M. FAIRCHILD, OF NEW YORK, N. Y.

UNIVERSAL MOUNTING FOR AERIAL CAMERAS.

Application filed October 17, 1922. Serial No. 595,046.

*To all whom it may concern:*

Be it known that I, SHERMAN M. FAIRCHILD, a citizen of the United States of America, residing at New York, in the county of New York and State of New York, have invented certain new and useful Improvements in Universal Mountings for Aerial Cameras, of which the following is a full, clear, and exact description.

In photographing from an airplane it is usually desirable to have the edges of the plate or film in some definite relation to the objects on the ground, as for example parallel to streets or roads, or to the line of flight or in some definite relation to the points of the compass; especially in taking a succession of photographs which are subsequently to be matched or joined together to make a map or composite view of a territory larger in extent that can be embraced in a single photograph. If the nose of the airplane could always be kept in a fixed position with respect to the line of travel, as for instance pointed in the same direction as the motion of the plane, the problem indicated would present no difficulty, for it would only be necessary for the pilot to keep the plane headed in the proper direction; but when the line of flight is in any material degree transverse to the wind the plane usually "crabs"; that is, moves more or less sidewise. In such cases, if the camera is incapable of horizontal rotative adjustment the photographer has little or no control over the position of the plate in the respect referred to. It is accordingly the chief object of my present invention to provide for the camera a horizontally adjustable mounting of simple and effective character, and of compact construction, which can be easily and readily manipulated. To this and other ends the invention consists in the novel features hereinafter described.

Airplane cameras are commonly mounted in gimbals, so that the optical axis of the camera can be kept substantially vertical; and in carrying out my invention in the preferred manner I mount the gimbal ring rotatively on a circular carrier suspended from a support which may be permanently or non-adjustably fixed to an appropriate part of the airplane. Preferably, also, the carrier which supports the gimbal ring is located a substantial distance below the center of gravity of the camera. In such position the carrier surrounds the lens cone and hence can be made of relatively small diameter and still permit the swinging movement needed to keep the axis vertical as the plane banks or tilts in any direction.

An embodiment of the type outlined is illustrated in the accompanying drawings, in which—

Fig. 1 is an elevation, partly in section on line 1—1 of Fig. 3.

Fig. 2 is a detail section on line 2—2 of Fig. 1.

Fig. 3 is a plan view.

In the drawings the strips 10, 11, may be taken to represent any suitable supporting members or frame carried by or forming part of the airplane. From these members the entire camera assembly illustrated is removably supported by means of four clamps 12 of the C-type, of which the fixed jaws 13 are provided with thick rings 14 composed of soft rubber or other suitable yielding material, held firmly in place by means of washers 15 and nuts 16 on downwardly extending stems 17. These rubber rings are firmly embraced by the upper ends of the four depending arms 18 which curve inwardly as indicated and have their lower ends connected to the supporting ring 19. The function of the rubber cushion rings is to absorb vibration and other slight shocks, to which the plane may be subjected, and thus prevent the same from affecting the camera.

At the top of the annular carrier 19 is an inwardly extending flange 20, and on the latter the rotatable adjusting or carrier ring 21 is mounted, held in place by a retainer ring 22 on the bead 23. The retainer is readily removed by taking out the screws 24, whereupon the adjusting ring and the parts carried thereby can be lifted out at once.

Fixed at diametrically opposite sides of the adjusting ring 21 are two upwardly extending outwardly curved arms 25, provided at the top with clamping supports 26 for the pivots 27 of the gimbal ring 28. As shown, these pivots are themselves fitted in bearings on the upper ends of arms 29 extending upwardly and outwardly from the ring 28. The particular gimbal "ring" illustrated is more or less rectangular in plan instead of circular, and accordingly the expression "gimbal frame", or simply the word "gimbal", is used hereinafter as a generic term to include any member or device suitable for the purpose regardless of its specific shape.

The camera 30 is supported in the gimbal frame 28 by means of two arms 31 secured to the camera and having at their upper ends openings 32 for the pivots 33 which turn in the supporting bearings 34 on the upper ends of a pair of arms 35 rising from the gimbal frame 28. The camera pivots 33 are in line with each other, 90° from the gimbal ring pivots 27, so that no matter in what direction the airplane may tilt, the camera axis can remain or be maintained in the vertical position. The four bearings shown are all like the bearing shown in Figs. 1 and 2, consisting of a lower leaf 36 integral with the arm 35, an upper leaf 37 pivoted on the lower, a screw 38 pivoted in the lower leaf to swing into and out of a recess 39 (Fig. 3) in the free end of the upper leaf, and a thumb-nut 40 on the screw to hold the upper leaf lightly on the pivot 33. Preferably the pivots are driven into the apertures 32. Setting up the clamping nuts 40 holds the pivots firmly when it is desired to fix the camera in position. At any time, however, the camera can be lifted out of the gimbal frame and the latter out of the supporting ring merely by opening the pivot-clamps, as will be readily understood.

The use of arms for hanging the various parts from their respective pivots is an advantageous feature, as it enables me to bring the supporting ring and rotatable carrier ring well below the pivot-plane (passing through or close to the center of gravity of the camera and gimbal frame) and below the upper end or base of the lens cone 42. The latter is considerably smaller in its horizontal dimensions than is the camera body itself, and hence the rotatable member of the mounting can be made correspondingly smaller in diameter than would be possible if it were located in the pivot-plane. Similarly, for the same reason the gimbal frame itself can be made much smaller and can conform to the shape of the camera body; whereas if the camera were rotatable in the gimbal frame the latter would have to be circular in part at least, and of a diameter at least as great as the diagonal of the camera.

The arms 25 afford convenient grasp for turning the ring 21, making it unnecessary, in most cases, to provide special handles for the purpose.

It is to be understood that the invention is not limited to the construction herein specifically illustrated and described but can be embodied in other forms without departure from its spirit.

I claim—

1. In an apparatus for aerial photography, in combination, a camera, a gimbal frame encircling the camera, pivotal connections between the camera and the frame at opposite sides thereof to permit the camera to swing in the frame, on a transverse axis, a carrier for the frame, pivotal connections between the carrier and the frame to permit the latter to swing on an axis at right angles to the first mentioned axis, and a support for the carrier in which the same is rotatably mounted.

2. In an apparatus for aerial photography, in combination, a camera, a gimbal frame encircling the camera and having pivotal connection therewith to permit the camera to swing in the frame on a transverse axis, an annular carrier encircling the camera below the gimbal frame, and having upwardly extending arms pivotally connected to the gimbal frame to permit the latter to swing on an axis transverse to the first-named axis, and a support for said carrier permitting horizontal rotation of the latter.

3. In an apparatus for aerial photography, in combination, a camera having a downwardly extending lens cone, a gimbal frame encircling the camera and pivotally connected thereto, an annular carrier encircling the camera below the upper end of the lens cone and pivotally connected to the gimbal frame in the plane of the latter's pivotal connection with the camera, and a support for the annular carrier in which the latter is horizontally rotatable.

4. In an apparatus for aerial photography, in combination, a supporting frame, an annular support depending therefrom, an annular carrier rotatably mounted on the annular support, a pair of arms extending upwardly from the annular carrier at opposite sides thereof, a gimbal between said arms and pivotally connected to the upper ends thereof to swing on a transverse axis, and a camera inside of the gimbal and pivotally connected thereto to swing on an axis transverse to the first-mentioned axis.

5. In an apparatus for aerial photography, in combination, a camera having a body non-circular in plan and a lens cone extending downwardly from the body, a gimbal frame surrounding the camera and shaped in conformity to the non-circular shape of the camera, pivotal connections between the gimbal frame and the camera to permit the latter to swing on a transverse axis, a carrier ring circular in plan encircling the lens cone of the camera below the gimbal frame, pivotal connections between the carrier ring and the gimbal frame to permit the latter to swing on an axis transverse to the first-mentioned axis, and a support for the carrier in which the latter is rotatively mounted.

6. In an apparatus for aerial photography, in combination, a camera, a gimbal frame surrounding the camera and pivotally connected thereto to permit the latter to swing on a transverse axis, a carrier ring encircling the camera below the gimbal frame and having pivotal connection therewith to permit the latter to swing on an axis transverse to the first mentioned axis and in the same plane, a support for the carrier ring in which the latter is rotatably adjustable, a supporting frame adjacent to the gimbal frame, and means for suspending the said support from the supporting frame.

7. In an apparatus for aerial photography, in combination, a camera, supporting members arranged on opposite sides of the camera, a plurality of arms detachably mounted on said members and depending therefrom, an annular support carried by said arms below said members, a rotatably adjustable carrier mounted on the support and provided with upwardly extending arms on opposite sides, a gimbal frame arranged in a plane between the supporting members and the carrier and pivotally connected with said arms to permit the frame to swing on a transverse axis in a plane above the gimbal frame, and a camera arranged in the gimbal frame and pivotally connected with the latter to permit the camera to swing on an axis transverse to the first-mentioned axis and in the same plane.

8. In an apparatus for aerial photography, in combination, a supporting frame, cushioning members mounted thereon, a support suspended from the cushioning members, a carrier ring rotatively mounted on the support, a gimbal frame carried by the carrier ring and pivotally connected therewith to swing on a transverse axis, and a camera pivotally mounted in the gimbal frame to swing on an axis transverse to the first mentioned axis.

9. In an apparatus for aerial photography, in combination, a camera, a gimbal frame surrounding and pivotally connected to the camera to permit the latter to swing on a transverse axis fixed with reference to both the camera and the gimbal frame, a carrier ring pivotally connected with the gimbal frame to permit the latter to swing on a transverse axis fixed with reference to the gimbal frame, the carrier ring, and the camera; and a support for the carrier ring in which the latter is rotatably mounted.

10. In an apparatus for aerial photography, in combination, a camera, pivotal supports for the camera, a carrier for the pivotal supports, and a support for the carrier in which the same is mounted for rotative adjustment in a plane transverse to the axis of the camera.

11. In an apparatus for aerial photography, in combination, a camera, a frame in which the camera is pivotally mounted to swing on a transverse axis, a carrier in which said frame is mounted to swing about an axis transverse to the first mentioned axis, and a support for the carrier in which the same is rotatably mounted.

In testimony whereof I hereto affix my signature.

SHERMAN M. FAIRCHILD.